United States Patent
Kim et al.

(10) Patent No.: US 12,291,179 B1
(45) Date of Patent: May 6, 2025

(54) FOLDABLE PEDAL DEVICE FOR VEHICLES

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-Si (KR); Hyeon Uk Kim, Daegu (KR); Kyung Nam Kim, Daegu (KR)

(73) Assignees: Hyundai Motor Company, Seoul (KR); Kia Corporation, Seoul (KR); Kyung Chang Industrial Co., Ltd., Daegu (KR)

( * ) Notice: Subject to any disclaimer, the term of this patent is extended or adjusted under 35 U.S.C. 154(b) by 0 days.

(21) Appl. No.: 18/605,478

(22) Filed: Mar. 14, 2024

(30) Foreign Application Priority Data

Dec. 12, 2023 (KR) .......................... 10-2023-0179782

(51) Int. Cl.
*B60T 7/06* (2006.01)
*B60K 26/02* (2006.01)
*G05G 1/36* (2008.04)
*G05G 1/40* (2008.04)
*G05G 1/44* (2008.04)
*G05G 25/04* (2006.01)

(52) U.S. Cl.
CPC ................ *B60T 7/06* (2013.01); *B60K 26/02* (2013.01); *G05G 1/36* (2013.01); *G05G 1/40* (2013.01); *G05G 1/44* (2013.01); *G05G 25/04* (2013.01); *B60K 2026/024* (2013.01)

(58) Field of Classification Search
CPC .......................... G05G 25/04; B60K 2026/024
See application file for complete search history.

(56) References Cited

U.S. PATENT DOCUMENTS 11,312,236 B1 * 4/2022 Kim .......................... B60T 7/042
11,458,838 B1 * 10/2022 Kim .......................... B60T 7/06

FOREIGN PATENT DOCUMENTS

KR 10-2022-0055989 5/2022

\* cited by examiner

*Primary Examiner* — Vicky A Johnson
(74) *Attorney, Agent, or Firm* — Morgan, Lewis & Bockius LLP

(57) ABSTRACT

A foldable pedal device for vehicles enables an accelerator pedal module and a brake pedal module, which have different pop-up strokes, to be simultaneously popped up and hidden by operation of one actuator module and blocks introduction of moisture and foreign substances by shielding a gap between a footrest panel and the pedal module using a shield membrane.

20 Claims, 9 Drawing Sheets

FOLDABLE PEDAL DEVICE FOR VEHICLES

CROSS-REFERENCE TO THE RELATED APPLICATION

The present application claims priority to Korean Patent Application No. 10-2023-0179782, filed on Dec. 12, 2023, the entire contents of which is incorporated herein for all purposes by this reference.

BACKGROUND OF THE PRESENT DISCLOSURE

Field of the Present Disclosure

The present disclosure relates to a foldable pedal device for vehicles, and more particularly, to a foldable pedal device for vehicles that enables an accelerator pedal module and a brake pedal module to be simultaneously popped up and hidden by operation of one actuator module.

Description of Related Art

An autonomous vehicle is a smart vehicle employing autonomous driving technology by which the vehicle is capable of autonomously travelling to a set destination by itself without manipulation of the steering wheel, the accelerator, the brake, or the like by a driver. These days, the development of such autonomous vehicles is accelerating.

In a case in which an autonomous driving situation is universally implemented, autonomous vehicles enable selection between a manual driving mode, in which a driver directly drives the vehicle, and an autonomous driving mode, in which the vehicle autonomously travels to a destination without a driving operation on the part of the driver.

In the autonomous driving mode, a driver may desire to rest comfortably while stretching out his or her legs. In the present case, if pedals (an accelerator pedal and a brake pedal) located in the space below the driver's seat remain exposed to the passenger compartment space of the vehicle, they may disturb the driver's relaxation.

Furthermore, in the autonomous driving mode, in which the driver does not need to operate the pedals (the accelerator pedal and the brake pedal) of the vehicle, if the driver operates the pedals, the controller of the vehicle determines that the driver desires to terminate the autonomous driving mode and to directly drive the vehicle, and terminates control for autonomous driving.

However, because the pedals of the vehicle are mounted in the space below the driver's seat and are thus exposed, the driver may unintentionally operate the pedals in the autonomous driving mode (the situation in which the pedals are erroneously operated), which may cause an accident depending on the road conditions, the distance between vehicles, or the like.

Therefore, there is the need for development of a foldable pedal device for exposing a pedal pad to a passenger compartment space so that the pedal is capable of being operated by a driver in a manual driving mode, in which the driver directly drives the vehicle, and preventing exposure of the pedal pad to the passenger compartment space so that the pedal is prevented from being operated by the driver in an autonomous driving mode to prevent erroneous operation of the pedal and thus to secure comfortable relaxation and safety of the driver.

In the case of a general foldable pedal device, the pop-up stroke of the brake pedal is greater than that of the accelerator pedal. Accordingly, in a popped-up state, the brake pedal is maintained in the state of protruding farther than the accelerator pedal. Through this, erroneous operation of the pedals may be prevented.

Accordingly, when the pop-up strokes of the accelerator pedal and the brake pedal are different from each other, if the accelerator pedal and the brake pedal may be simultaneously popped up and hidden by one actuator module, weight reduction and cost reduction may be achieved.

Furthermore, the accelerator pedal and the brake pedal are usually mounted to be popped up and hidden through a footrest panel disposed below the driver's seat. In the instant case, however, small gaps are present between the footrest panel and the pedals. Therefore, a structure blocking introduction of moisture and foreign substances through the small gaps is also needed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal device for vehicles, which enables an accelerator pedal module and a brake pedal module, which have different pop-up strokes, to be simultaneously popped up and hidden by operation of one actuator module, achieving weight reduction and cost reduction and maximizing the efficiency of use of space in the vehicle through reduction in the size thereof.

Furthermore, it is another object of the present disclosure to provide a foldable pedal device for vehicles, which blocks introduction of moisture and foreign substances by shielding a gap between a footrest panel and a pedal module using a shield membrane, improving the durability and marketability thereof.

In accordance with the present disclosure, the above and other objects may be accomplished by the provision of a foldable pedal device for vehicles, including an accelerator pedal module and a brake pedal module mounted in a case to be spaced from each other in a leftward-rightward direction of the vehicle and configured to be moved in response to an operation of a driver and an actuator module fixedly mounted in the case to be in contact with both the accelerator pedal module and the brake pedal module and configured to simultaneously pop up the accelerator pedal module and the brake pedal module from the case or hide the accelerator pedal module and the brake pedal module in the case.

Each of the accelerator pedal module and the brake pedal module may include a pedal pad configured to be operated by the driver, a pedal arm fixed to the pedal pad, and a pedal housing pivotally coupled to the pedal arm via a hinge pin.

The pedal pad and the pedal arm may overlap each other in an upward-downward direction of the vehicle and may be fixed to each other to be integrated, and the pedal arm may be coupled to the pedal housing so that an upper end portion thereof is pivotable forwards and backwards of the vehicle relative to the pedal housing about the hinge pin coupled to a lower end portion thereof.

The pedal housing may be accommodated in the case, the hinge pin may penetrate the pedal housing and may be coupled at each end portion of the accelerator pedal module and the brake pedal to the case, and the pedal housing may be coupled to the case to be pivotable relative to the case about the hinge pin.

The case may be located inside a footrest panel and may include an open upper portion coupled to and sealed by the footrest panel, and the accelerator pedal module and the brake pedal module may be mounted through the footrest panel.

The foldable pedal device may further include shield membranes made of an elastic material and mounted in holes formed in the footrest panel to allow the accelerator pedal module and the brake pedal module to pass therethrough. The shield membranes may shield the holes to block introduction of foreign substances into the case.

The shield membranes may be disposed between the pedal pad and the pedal arm of the accelerator pedal module and between the pedal pad and the pedal arm of the brake pedal module.

The actuator module may include a first motor fixedly mounted in the case, a leadscrew connected to the first motor via a gear member and configured to be rotated by power from the first motor, a nut configured to allow the leadscrew to pass through the nut while being threadedly engaged with the nut and to move in a longitudinal direction of the leadscrew during rotation of the leadscrew, and a first support portion and a second support portion connected to the nut, disposed on the left and right of the nut, and configured to move backward along the leadscrew together with the nut to contact with a lower surface of the pedal housing when the accelerator pedal module and the brake pedal module are popped up and to move forward along the leadscrew together with the nut to be separated away from the pedal housing when the accelerator pedal module and the brake pedal module are hidden.

The actuator module may further include a second motor fixedly mounted in the case and connected to the gear member.

The foldable pedal device may further include a pedal housing spring coupled at one end portion thereof to the pedal housing of each of the accelerator pedal module and the brake pedal module and coupled at the other end portion thereof to the case to apply elastic force to the pedal housing so that the pedal housing pivots in a direction in which the pedal housing is inserted into the case.

The pedal housing may include a lower surface, which includes a planar portion formed in parallel to an internal bottom portion of the case to contact each of the first support portion and the second support portion moving forwards and backwards and an inclined portion extending at an incline forward and upward from a front end portion of the planar portion and defining a space to receive the first support portion and the second support portion between the pedal housing and the internal bottom portion of the case to prevent the first support portion and the second support portion from contacting with the pedal housing.

An angle formed between the planar portion and the inclined portion may be greater than 90 degrees and less than 180 degrees.

When the leadscrew rotates due to operation of the first motor and each of the first support portion and the second support portion moves backward along the leadscrew together with the nut and comes into contact with the planar portion of the pedal housing, each of the accelerator pedal module and the brake pedal module may pivot about the hinge pin and may enter a popped-up state in which the pedal pad and the pedal arm protrude from the footrest panel.

When the accelerator pedal module and the brake pedal module are in the popped-up state, each of the first support portion and the second support portion may be in contact with both the planar portion of the pedal housing and the internal bottom portion of the case, and when the driver manipulates the pedal pad, manipulation force is supported by the connection structure between the pedal housing and the case via each of the first support portion and the second support portion.

The pop-up position of each of the accelerator pedal module and the brake pedal module may be fixed by a corresponding one of the first support portion and the second support portion fitted between the planar portion of the pedal housing and the case.

When the leadscrew rotates due to operation of the first motor and each of the first support portion and the second support portion moves forward along the leadscrew together with the nut and is received in the space between the inclined portion of the pedal housing and the case, each of the accelerator pedal module and the brake pedal module may be pulled by the pedal housing spring to pivot about the hinge pin and may enter a hidden state in which each of the accelerator pedal module and the brake pedal module is inserted into the case.

The case may be provided with a case stopper protruding toward the pedal arm, and the hide position of each of the accelerator pedal module and the brake pedal module may be fixed when the lower surface of the pedal housing comes into contact with the case stopper.

When the accelerator pedal module and the brake pedal module are in the hidden state, the planar portion of the pedal housing of the brake pedal module may protrude farther downward than the planar portion of the pedal housing of the accelerator pedal module, whereby the surface of the pedal pad of the accelerator pedal module and the surface of the pedal pad of the brake pedal module may be located on the same imaginary plane.

When the accelerator pedal module and the brake pedal module are in the popped-up state, the surface of the pedal pad of the brake pedal module may further protrude than the surface of the pedal pad of the accelerator pedal module to prevent erroneous operation.

The first support portion and the second support portion may be formed to have the same diameter. When the accelerator pedal module and the brake pedal module enter the popped-up state while being supported on the first support portion and the second support portion, the surface of the pedal pad of the brake pedal module may further protrude than the surface of the pedal pad of the accelerator pedal module by a difference in position between the planar portion of the accelerator pedal module and the planar portion of the brake pedal module in the hidden state.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
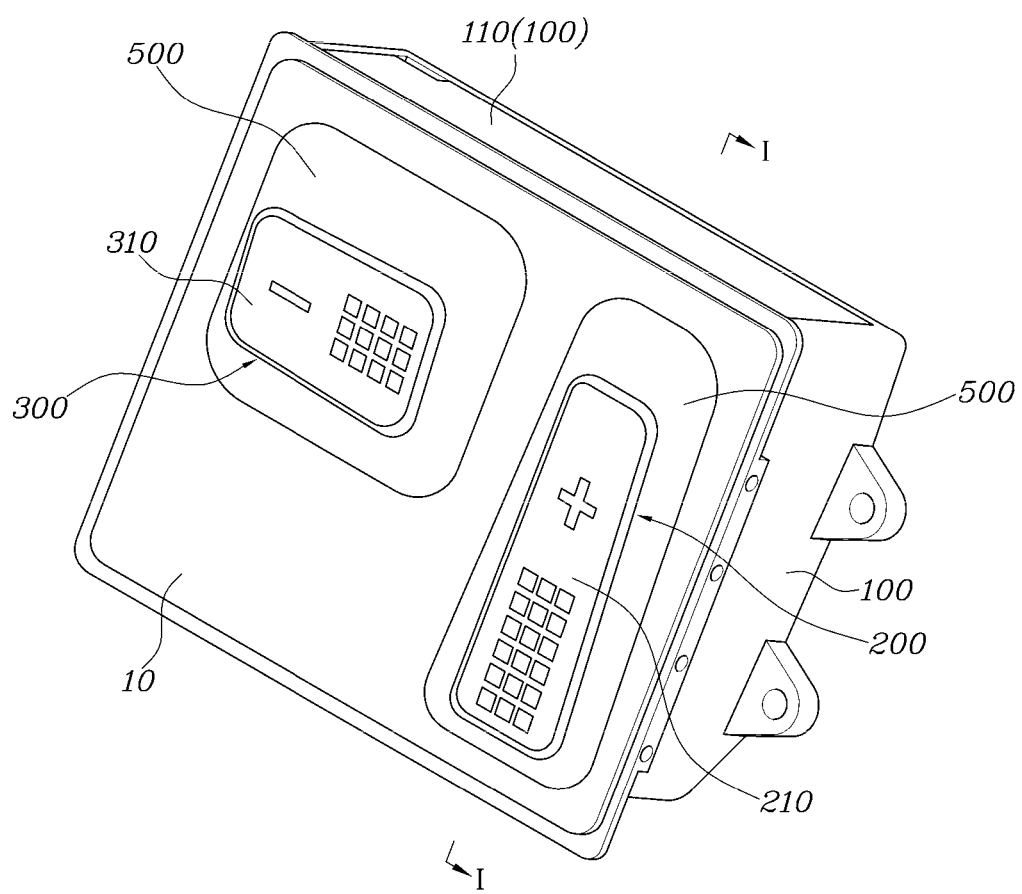
FIG. 1 is view showing a popped-up state of a foldable pedal device according to an exemplary embodiment of the present disclosure.
Figure 2:
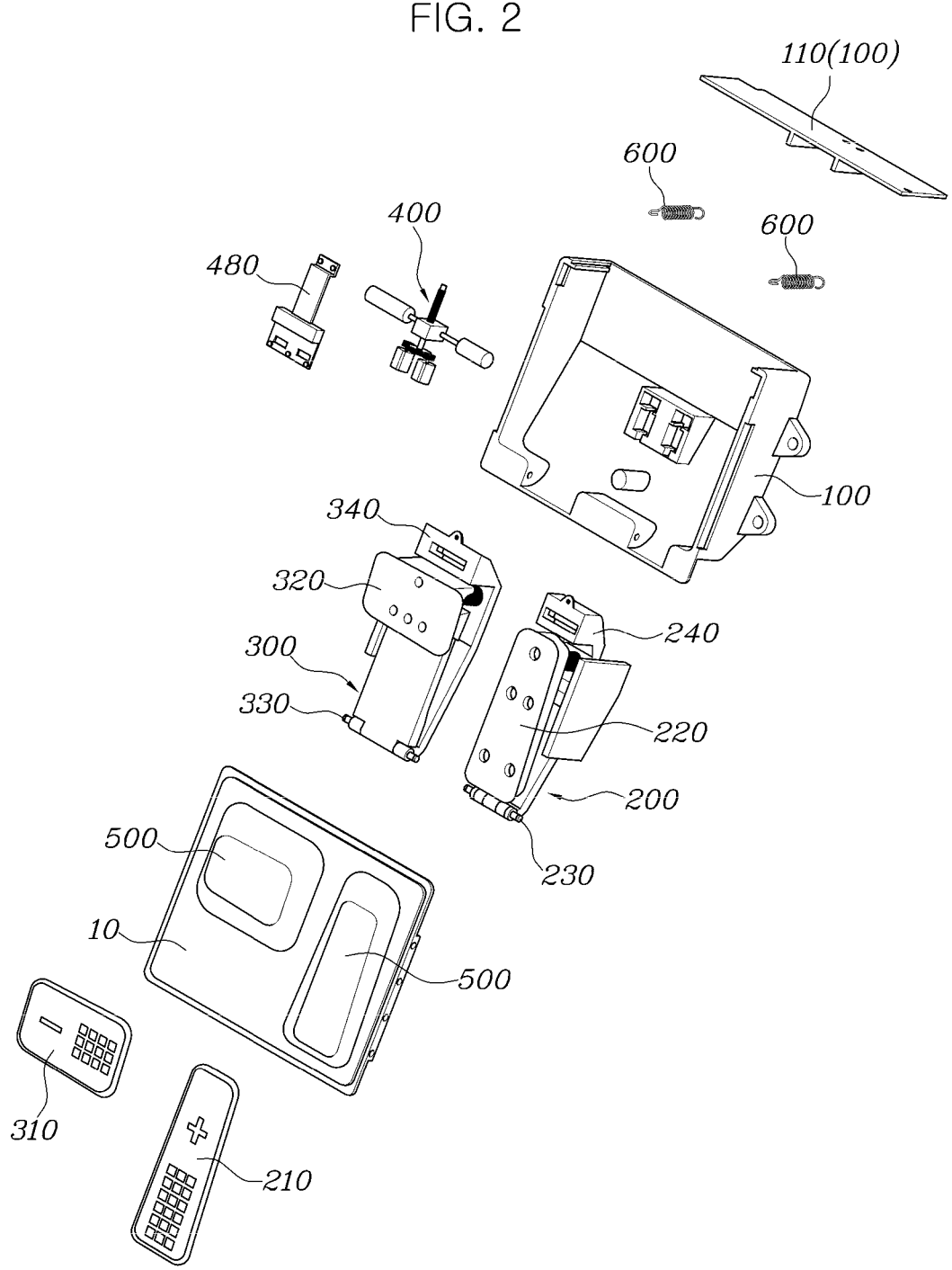
FIG. 2 is an exploded view of FIG. 1.
Figure 3:
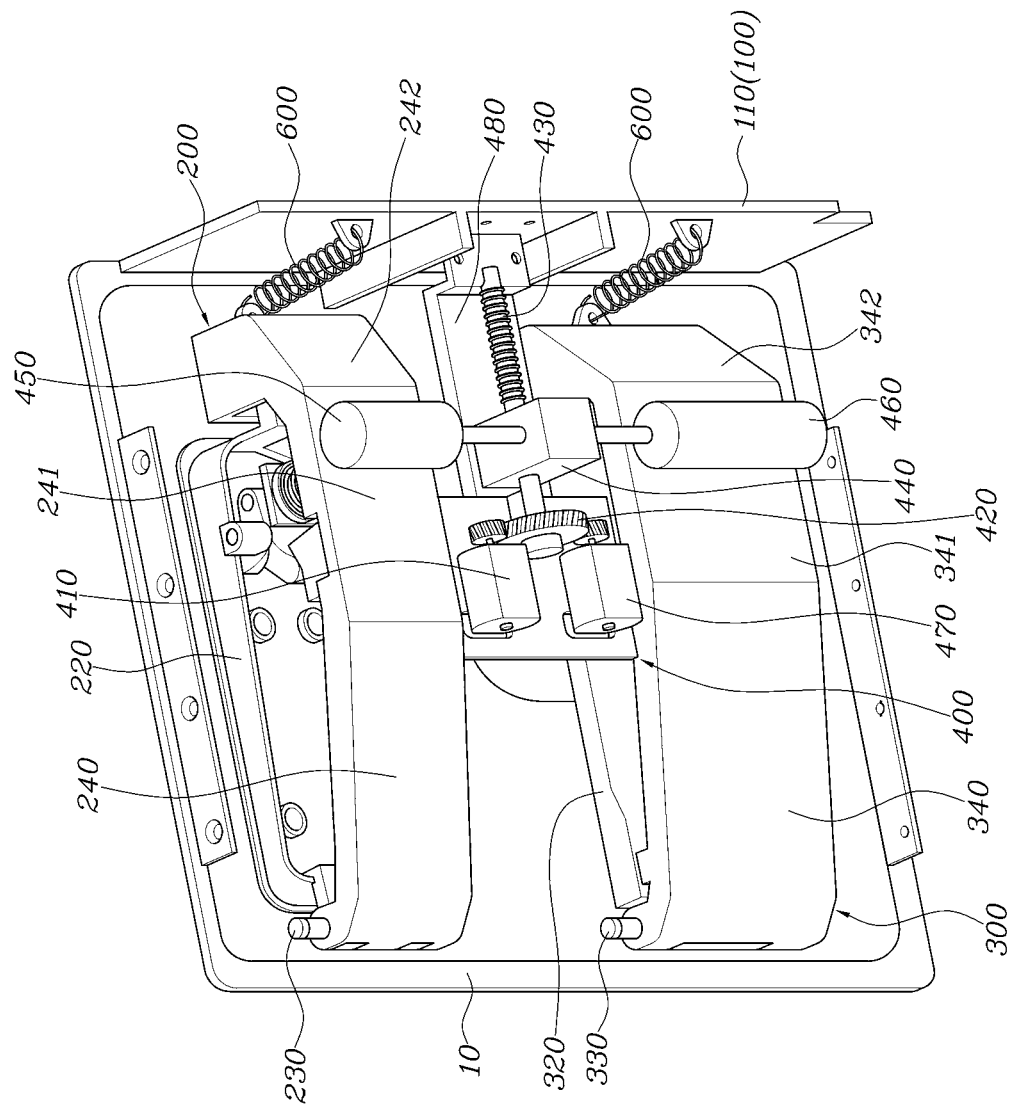
FIG. 3 is a bottom view of FIG. 1, with a case removed therefrom.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, the exemplary embodiments included in the present specification will be described in detail with reference to the accompanying drawings, and the same or similar elements are denoted by the same reference numerals even though they are depicted in different drawings, and redundant descriptions thereof will be omitted.

In the following description, with respect to constituent elements used in the following description, the suffixes "module" and "unit" are used only in consideration of facilitation of description, and do not have mutually distinguished meanings or functions.

In the following description of the exemplary embodiments included in the present specification, a detailed description of known functions and configurations incorporated herein will be omitted when the same may make the subject matter of the exemplary embodiments included in the present specification rather unclear.

Furthermore, the accompanying drawings are provided only for a better understanding of the exemplary embodiments included in the present specification and are not intended to limit the technical ideas included in the present specification. Therefore, it should be understood that the accompanying drawings include all modifications, equivalents, and substitutions within the scope and spirit of the present disclosure.

It will be understood that although the terms "first", "second", etc., may be used herein to describe various components, these components should not be limited by these terms. These terms are only used to distinguish one component from another component.

It will be understood that when a component is referred to as being "connected to" or "coupled to" another component, it may be directly connected to or coupled to another component, or intervening components may be present.

On the other hand, when a component is referred to as being "directly connected to" or "directly coupled to" another component, there are no intervening components present.

As used herein, the singular form is intended to include the plural forms as well, unless the context clearly indicates otherwise.

It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Furthermore, the terms "unit" and "control unit" forming portion of the names of the motor control unit (MCU) and the hybrid control unit (HCU) are merely terms that are widely used in the naming of a controller for controlling a specific function of a vehicle, and should not be construed as meaning a generic function unit.

To control the function peculiar thereto, a controller may include a communication device, which communicates with other controllers or sensors, a memory, which stores therein an operating system, logic commands, and input/output information, and one or more processors, which perform determinations, calculations, and decisions necessary for control of the function peculiar thereto.

Hereinafter, a foldable pedal device for vehicles according to an exemplary embodiment of the present disclosure will be described with reference to the accompanying drawings.

As shown in FIG. 1, FIG. 2, FIG. 3, FIG. 4, FIG. 5, FIG. 6, FIG. 7, FIG. 8 and FIG. 9, a foldable pedal device for vehicles according to an exemplary embodiment of the present disclosure includes an accelerator pedal module 200 and a brake pedal module 300, which are mounted in a case 100 to be spaced from each other in a leftward-rightward direction of the vehicle and are configured to be moved in response to an operation of a driver, and includes an actuator module 400, which is fixedly mounted in the case 100 to be in contact with the accelerator pedal module 200 and the brake pedal module 300 and is configured to simultaneously pop up or hide the accelerator pedal module 200 and the brake pedal module 300.

The accelerator pedal module 200 and the brake pedal module 300 have an advantage of high commonality because the configurations and operations of components thereof are extremely similar to each other.

Each of the accelerator pedal module 200 and the brake pedal module 300 includes a pedal pad 210 or 310 configured to be operated by the driver, a pedal arm 220 or 320 coupled to the pedal pad 210 or 310, and a pedal housing 240 or 340 coupled to the pedal arm 220 or 320 via a hinge pin 230 or 330.

Furthermore, the pedal pad 210 or 310 and the pedal arm 220 or 320 overlap each other in an upward-downward direction of the vehicle and are fixed to each other to be integrated. The pedal arm 220 or 320 is coupled to the pedal housing 240 or 340 so that the upper end portion thereof is pivotable forwards and backwards of the vehicle relative to the pedal housing 240 or 340 about the hinge pin 230 or 330 coupled to the lower end portion thereof.

Each of the accelerator pedal module 200 and the brake pedal module 300 according to an exemplary embodiment of the present disclosure may be of an organ type configured so that the lower end portion of the pedal arm 220 or 320, to which the pedal pad 210 or 310 is coupled, is pivotably coupled to the pedal housing 240 or 340 via the hinge pin 230 or 330 and the upper end portion of the pedal pad 210 or 310 pivots forwards and backwards about the hinge pin 230 or 330.

Furthermore, to prevent erroneous operation by the driver, the accelerator pedal module 200 may be mounted to be elongated vertically, and the brake pedal module 300 may be mounted to be elongated horizontally. However, the present disclosure is not limited thereto.

The pedal device according to an exemplary embodiment of the present disclosure is configured so that the pedal housing 240 or 340 is accommodated in the case 100, the hinge pin 230 or 330 is provided to penetrate the pedal housing 240 or 340 and is coupled at both end portions thereof to the case 100, and the pedal housing 240 or 340 is coupled to the case 100 to be pivotable relative to the case 100 about the hinge pin 230 or 330.

The accelerator pedal module 200 and the brake pedal module 300 according to an exemplary embodiment of the present disclosure need to be structured to pivot relative to the case 100 when popped up or hidden by operation of the actuator module 400.

To the present end, the pedal housing 240 or 340 of each of the accelerator pedal module 200 and the brake pedal module 300 is structured so that the lower end portion of the pedal housing 240 or 340 is pivotably coupled to the case 100 via the hinge pin 230 or 330 and the upper end portion of the pedal housing 240 or 340 pivots forwards and backwards about the hinge pin 230 or 330.

The case 100 is located inside a footrest panel 10, and includes an open upper portion coupled to and sealed by the footrest panel 10. The accelerator pedal module 200 and the brake pedal module 300 may be mounted through the footrest panel 10.

As shown in FIG. 1, FIG. 2, FIG. 3, FIG. 4, and FIG. 5, in the popped-up state of the pedal device according to an exemplary embodiment of the present disclosure, the pedal pads 210 and 310 and the pedal arms 220 and 320 of the accelerator pedal module 200 and the brake pedal module 300 are in a state of protruding in the passenger compartment space through the footrest panel 10, and the pedal housings 240 and 340 are located in the case 100 inside the footrest panel 10.

In the popped-up state, the driver may operate the accelerator pedal module 200 and the brake pedal module 300 to drive the vehicle in a manual driving mode.

Figure 7:
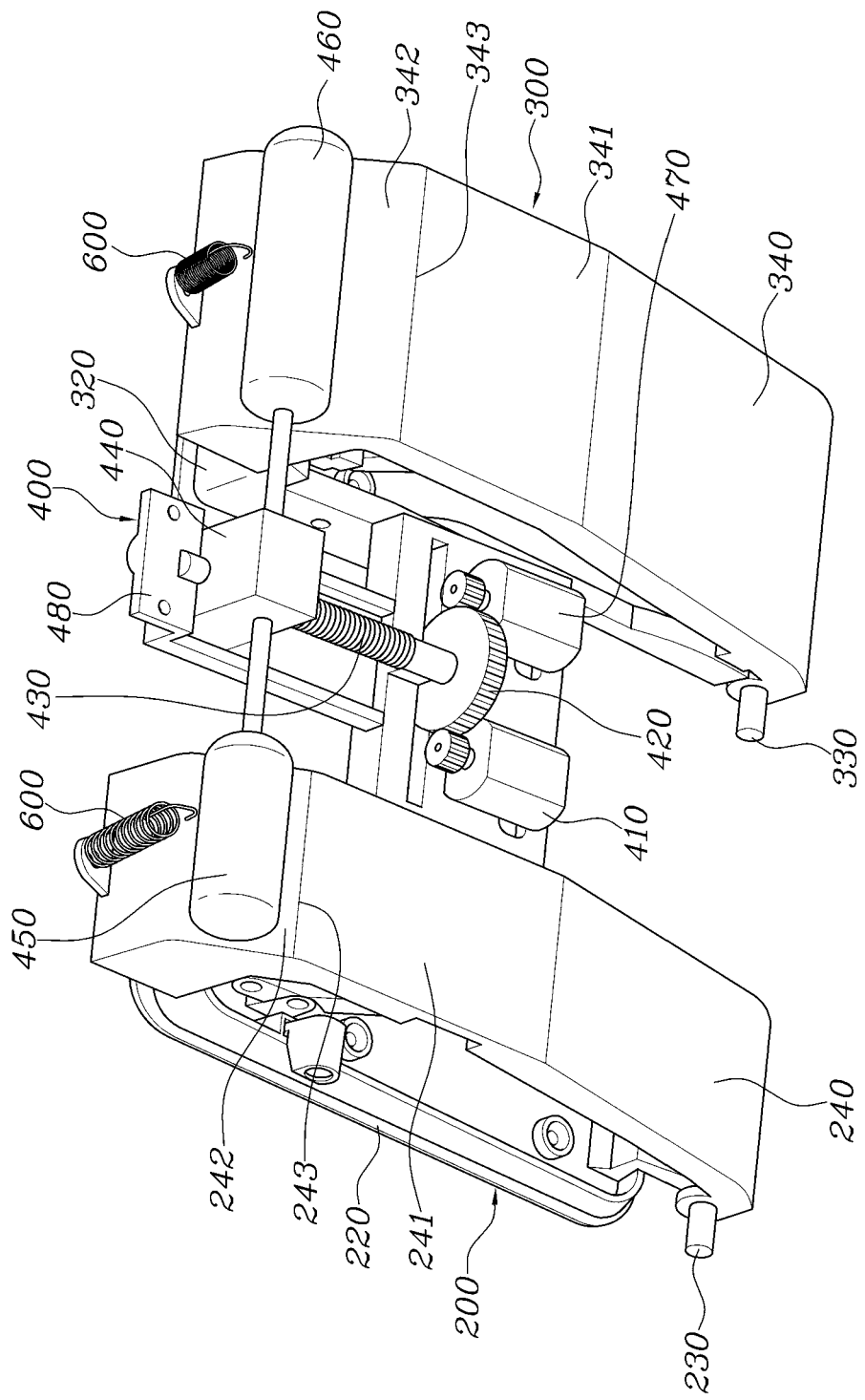
FIG. 7 is a view showing a hidden state of the accelerator pedal module and the brake pedal module.
Figure 8:
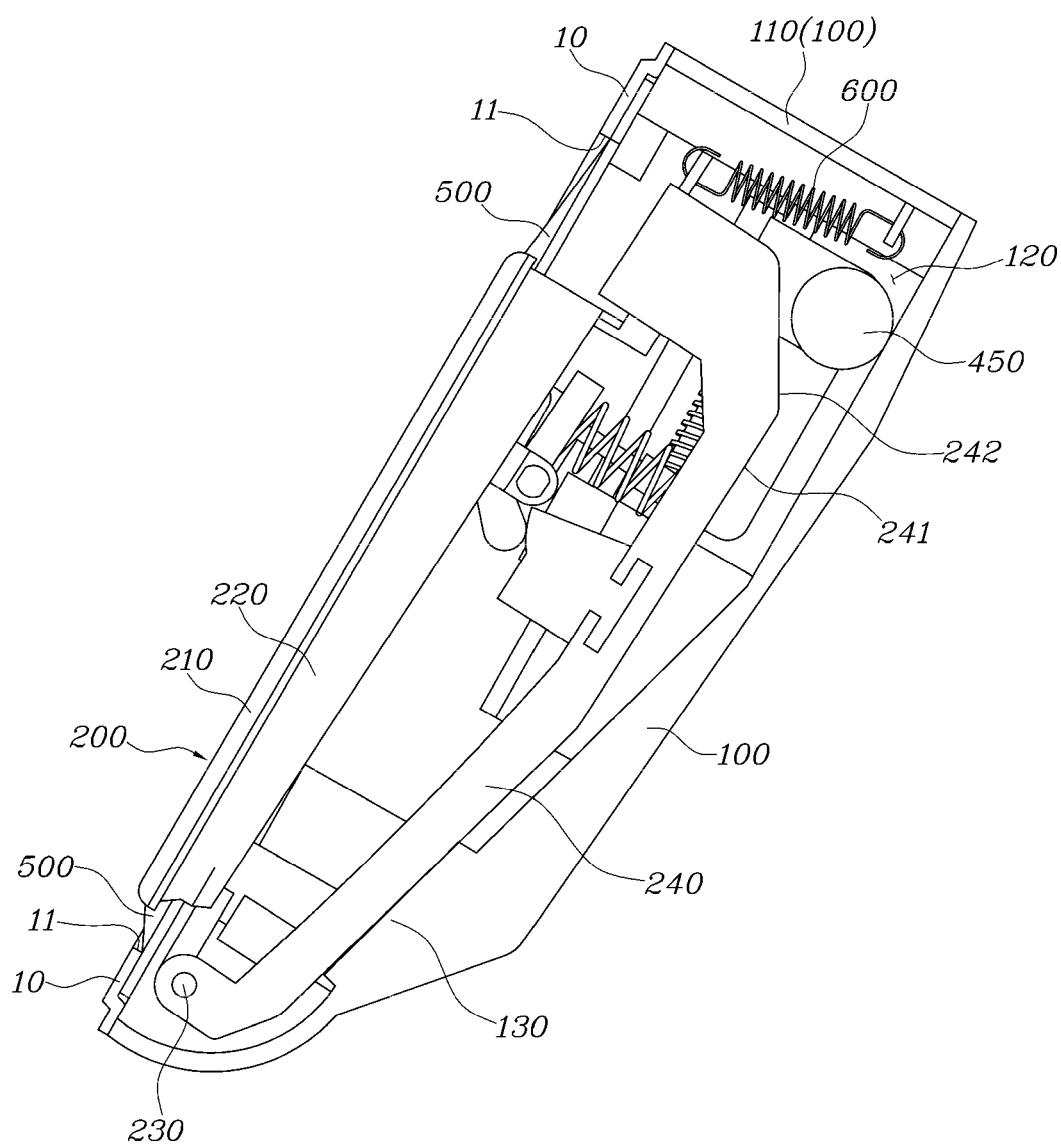
FIG. 8 is a view for explaining the pedal module in the hidden state.
Figure 9:
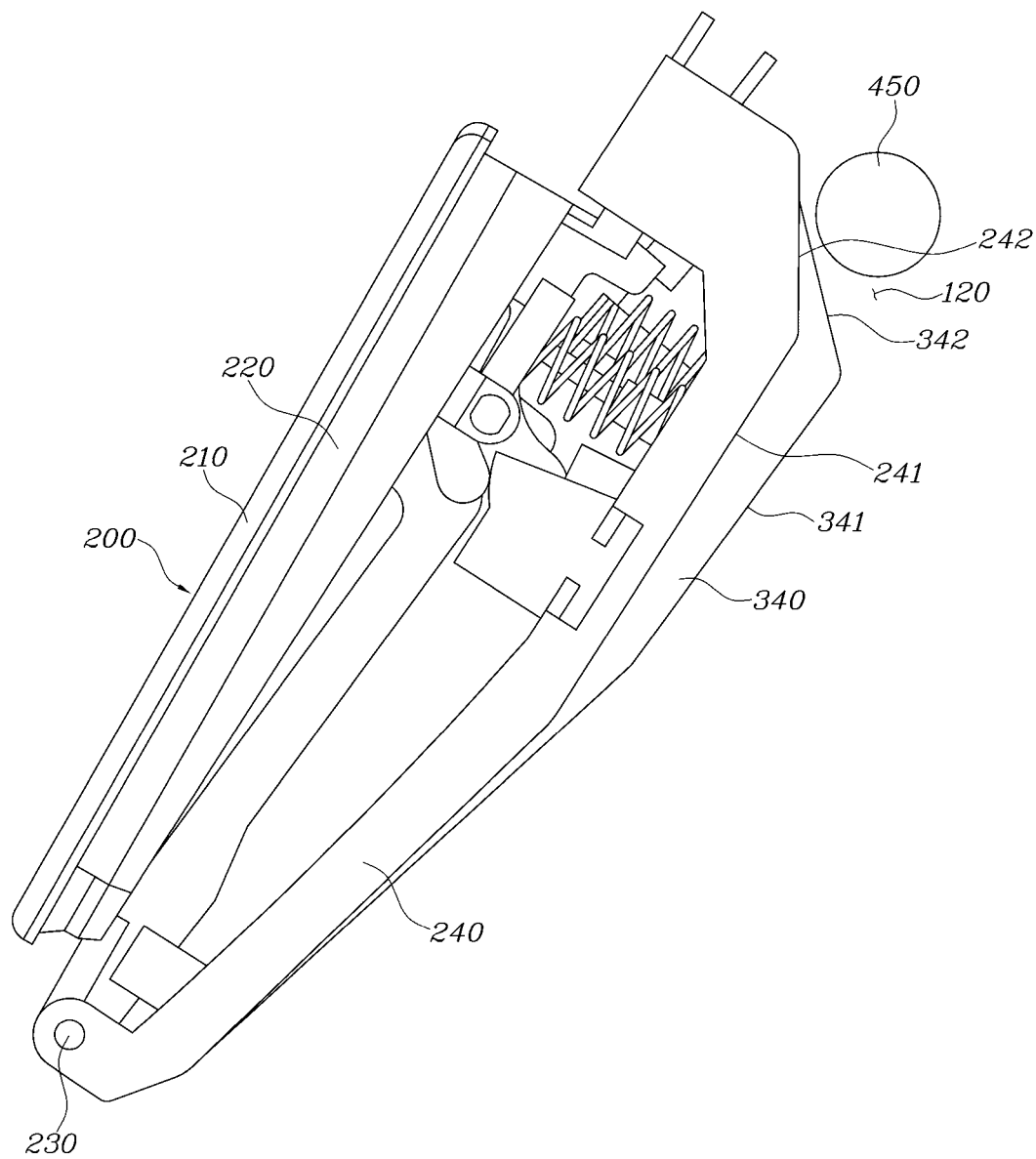
FIG. 9 is a view for explaining a state in which a pedal housing of the brake pedal module protrudes farther downward than a pedal housing of the accelerator pedal module in the hidden state.

Furthermore, as shown in FIGS. 7 to 9, in the hidden state of the pedal device according to an exemplary embodiment of the present disclosure, the pedal pads 210 and 310 of the accelerator pedal module 200 and the brake pedal module 300 are in contact with the footrest panel 10, and the pedal arms 220 and 320 and the pedal housings 240 and 340 are located in the case 100 inside the footrest panel 10.

In the hidden state, since the accelerator pedal module 200 and the brake pedal module 300 are inserted into and hidden by the case 100, operation of the pedal housing 240 or 340 by the driver is impossible, and the vehicle may be driven in an autonomous driving mode while allowing the driver to rest comfortably. Furthermore, it is possible to prevent erroneous operation of the pedals during autonomous driving, improving driving safety.

The pedal device according to an exemplary embodiment of the present disclosure further includes shield membranes 500 mounted in holes 11 formed in the footrest panel 10 to allow the accelerator pedal module 200 and the brake pedal module 300 to pass therethrough. The shield membranes 500 shield the holes 11 to block introduction of moisture and foreign substances into the case 100.

As shown in the drawings, two shield membranes 500 may be provided to be used for the accelerator pedal module 200 and the brake pedal module 300, respectively. Alternatively, a single shield membrane may be provided to be used in common.

The shield membranes 500 function not only to block introduction of moisture and foreign substances into the case 100 but also to prevent the internal structure of the case 100 from being externally exposed through the holes 11 in the footrest panel 10, improving the aesthetics of the pedal device.

The shield membranes 500 are formed of a flexible and elastic material so that the shape thereof changes according to operation of the accelerator pedal module 200 and the brake pedal module 300 by the driver or the pop-up and hide operations of the accelerator pedal module 200 and the brake pedal module 300.

The shield membranes 500 according to an exemplary embodiment of the present disclosure may be disposed between the pedal pads 210 and 310 and the pedal arms 220 and 320 of the accelerator pedal module 200 and the brake pedal module 300.

The pedal pads 210 and 310 are portions configured to be operated by the driver, and are exposed to the outside of the shield membranes 500 so that the driver easily recognizes the same. The pedal housings 240 and 340, including the pedal arms 220 and 320, are located to be shielded by the shield membranes 500 to improve the aesthetics of the pedal device.

The shield membranes 500 may be first coupled to the footrest panel 10 to cover the holes 11 in the footrest panel 10, and then the pedal pads 210 and 310 and the pedal arms 220 and 320 may be coupled to each other, with the shield membranes 500 interposed therebetween.

In the state in which the shield membranes 500 are interposed between the pedal pads 210 and 310 and the pedal arms 220 and 320, the pedal pads 210 and 310 and the pedal arms 220 and 320 may be coupled to each other using screws or bolts, whereby the pedal pads 210 and 310, the pedal arms 220 and 320, and the shield membranes 500 may be integrally coupled to each other. As needed, the shield membranes 500 and the pedal pads 210 and 310 may be bonded to each other to further improve the quality of the pedal device.

The actuator module 400 according to an exemplary embodiment of the present disclosure includes a first motor 410 fixedly mounted in the case 100, a leadscrew 430 connected to the first motor 410 via a gear member 420 and configured to be rotated by power from the first motor 410, a nut 440 configured to allow the leadscrew 430 to pass therethrough while being threadedly engaged therewith and to move in the longitudinal direction of the leadscrew 430 during rotation of the leadscrew 430, and a first support portion 450 and a second support portion 460 connected to the nut 440, disposed on the left and right of the nut 44, and configured to move backward along the leadscrew 430 together with the nut 440 to contact with the lower surfaces of the pedal housings 240 and 340 when the accelerator pedal module 200 and the brake pedal module 300 are popped up and to move forward along the leadscrew 430 together with the nut 440 to be separated away from the pedal housings 240 and 340 when the accelerator pedal module 200 and the brake pedal module 300 are hidden.

In the case 100, the first motor 410 is fixedly mounted between the pedal housing 240 of the accelerator pedal module 200 and the pedal housing 340 of the brake pedal module 300, the leadscrew 430 is mounted between the two pedal housings 240 and 340 to extend forward in the longitudinal direction of the pedal housings 240 and 340, and the nut 440 moves along the leadscrew 430 between the two pedal housings 240 and 340 during operation of the first motor 410.

An actuator cover 480 is coupled to the case 100 to protect the actuator module 400. The actuator cover 480 covers and protects the upper side of the actuator module 400.

One end portion of the leadscrew 430 is connected to the first motor 410 via the gear member 420, and the other end portion of the leadscrew 430 extends forward and is rotatably coupled to the actuator cover 480.

The gear member 420 includes a leadscrew gear coupled to one end portion of the leadscrew 430, a first motor gear 415 coupled to the first motor 410, and a second motor gear 425 coupled to a second motor 470 to be described later. The leadscrew gear is located at the center, and the first and second motor gears 415 and 425 are located on the left and right of the leadscrew gear and mesh with the leadscrew gear in a form of external gears.

When the leadscrew 430 rotates, the nut 440 moves along the leadscrew 430, and when the nut 440 moves, the first support portion 450 and the second support portion 460 move forwards and backwards together therewith.

The first support portion 450 may be configured to support the pedal housing 240 of the accelerator pedal module 200, and the second support portion 460 may be configured to support the pedal housing 340 of the brake pedal module 300.

Alternatively, the first support portion 450 may be configured to support the pedal housing 340 of the brake pedal module 300, and the second support portion 460 may be configured to support the pedal housing 240 of the accelerator pedal module 200.

Figure 4:
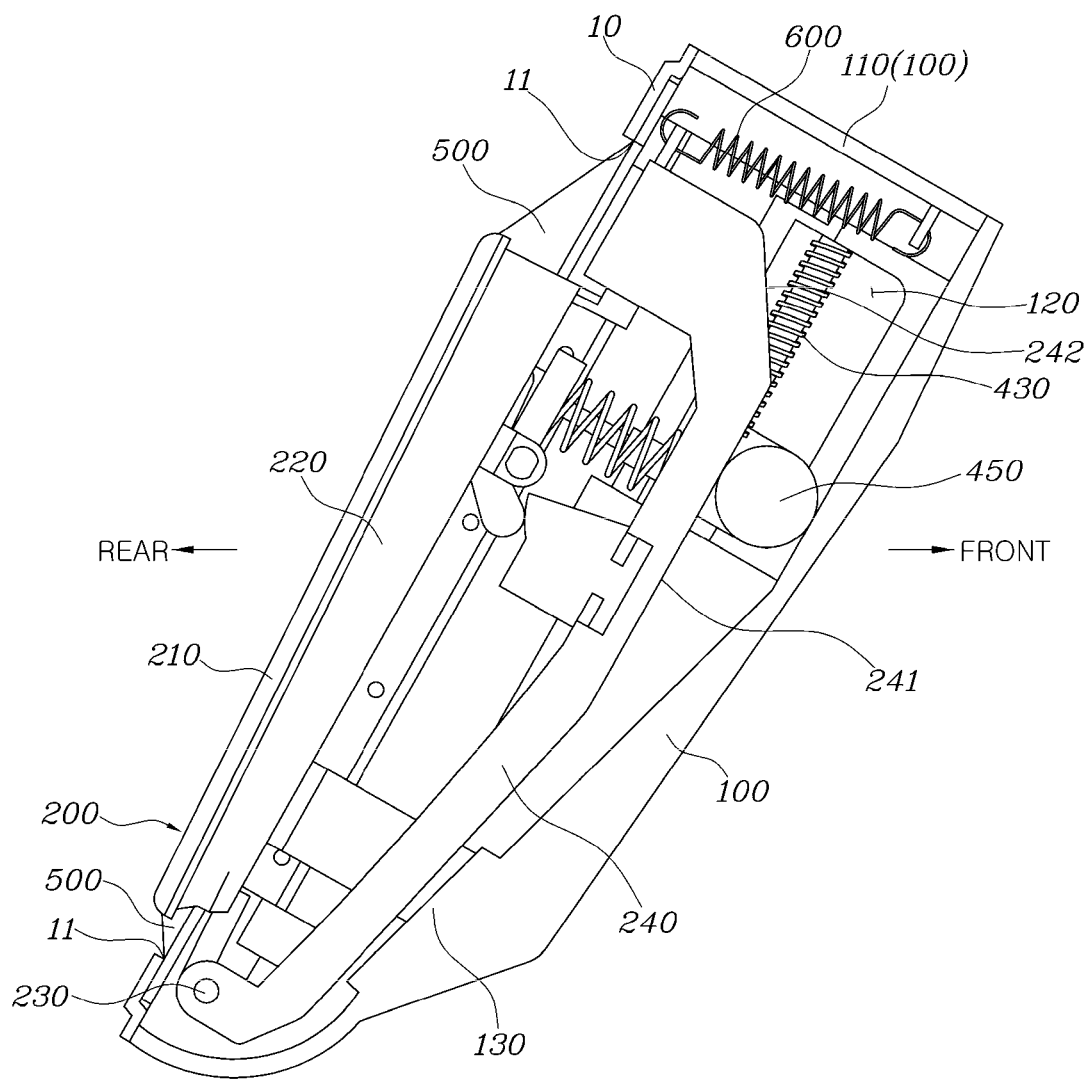
FIG. 4 is a cross-sectional view taken along line I-I in FIG. 1.

When the accelerator pedal module 200 and the brake pedal module 300 are simultaneously popped up, the first support portion 450 and the second support portion 460 move backward toward the first motor 410. In the popped-up state of the accelerator pedal module 200 and the brake pedal module 300, the first support portion 450 and the second support portion 460 are in contact with both the lower surfaces of the pedal housings 240 and 340 and the bottom portion of the case 100, as shown in FIG. 4.

When the accelerator pedal module 200 and the brake pedal module 300 are simultaneously hidden from the popped-up state, the first support portion 450 and the second support portion 460 move forward away from the first motor 410. In the hidden state of the accelerator pedal module 200 and the brake pedal module 300, the first support portion 450 and the second support portion 460 are spaced from the front sides of the pedal housings 240 and 340 and are not in contact with the pedal housings 240 and 340, as shown in FIG. 8.

When the accelerator pedal module 200 and the brake pedal module 300 enter the popped-up state from the hidden state, the first support portion 450 and the second support portion 460 come back into contact with the lower surfaces of the pedal housings 240 and 340 in a course of moving backward along the leadscrew 430.

Therefore, the first support portion 450 and the second support portion 460 are formed in a cylindrical shape to smoothly come into contact with the lower surfaces of the pedal housings 240 and 340 in a course of moving backward and to smoothly move backward in a state of being in contact with the pedal housings 240 and 340. However, the present disclosure is not limited thereto.

The actuator module 400 according to an exemplary embodiment of the present disclosure may further include a second motor 470 fixedly mounted in the case 100 and connected to the gear member 420.

The second motor 470 may be configured to operate simultaneously with the first motor 410, or may be configured to operate when the first motor 410 fails.

The first motor 410 may be used as a main motor, and the second motor 470 may be used as redundancy in preparation for failure of the first motor 410.

The pedal device according to an exemplary embodiment of the present disclosure may further include pedal housing springs 600, each of which includes an end portion coupled to a respective one of the pedal housings 240 and 340 of the accelerator pedal module 200 and the brake pedal module 300 and another end portion coupled to a front cover 110 of the case 100 to apply elastic force to the pedal housings 240 and 340 so that the pedal housings 240 and 340 pivot about the hinge pins 230 and 330 in a direction in which the pedal housings 240 and 340 are inserted into the case 100.

The front cover 110 may be formed as a portion of the case 100. The front cover 110 may be integrally formed with the front side of the case 100, or may be separately manufactured and coupled to the front side of the case 100 to seal the open front side of the case 100.

The front cover 110 may be mounted at a position spaced forward from the pedal housings 240 and 340 so that one end portion (upper end) thereof is connected to the footrest panel 10 and the other end portion (lower end) thereof is connected to the internal bottom portion of the front side of the case 100.

Two pedal housing springs 600 may be provided so that each of the two pedal housing springs 600 is connected at one end portion thereof to a respective one of the pedal housing 240 of the accelerator pedal module 200 and the pedal housing 340 of the brake pedal module 300.

The pedal housing springs 600 are implemented as a coil spring. Each of the pedal housing springs 600 is connected at one end portion (upper end) thereof to the front-upper end portion of a respective one of the pedal housings 240 and 340 and is connected at the other end portion (lower end) thereof to the front cover 110, serving to pull a respective one of the pedal housings 240 and 340 into the case 100.

The lower surfaces of the pedal housings 240 and 340 according to an exemplary embodiment of the present disclosure may include planar portions 241 and 341 formed in parallel to the internal bottom portion of the case 100 to contact with the first support portion 450 and the second support portion 460 moving forwards and backwards and inclined portions 242 and 342 extending at an incline from the front end portions of the planar portions 241 and 341 to the front-upper portions of the pedal housings 240 and 340 and defining a space 120 to receive the first support portion 450 and the second support portion 460 between the pedal housings 240 and 340 and the internal bottom portion of the case 100, preventing the first support portion 450 and the second support portion 460 from contacting with the pedal housings 240 and 340.

The lower surfaces of the pedal housings 240 and 340 include the planar portions 241 and 341 and the inclined portions 242 and 342. The inclined portions 242 and 342 extend forward from the planar portions 241 and 341, and the end portions of the inclined portions 242 and 342 become the front end portions of the pedal housings 240 and 340.

Bent portions 243 and 343, at which inflection occurs, are formed between the planar portions 241 and 341 and the inclined portions 242 and 342. When the first support portion 450 and the second support portion 460 move backward to hide the accelerator pedal module 200 and the brake pedal module 300 from the popped-up state, the first support portion 450 and the second support portion 460 come into contact with the bent portions 243 and 343 and thus come into contact with the pedal housings 240 and 340.

The planar portions 241 and 341 are surfaces formed in parallel to the internal bottom surface of the case 100, and the inclined portions 242 and 342 are surfaces bent at a predetermined angle with respect to the planar portions 241 and 341 and extending forward and upward. Due to the inclined portions 242 and 342, the space 120 in which the first support portion 450 and the second support portion 460 are received and hidden is defined between the inclined portions 242 and 342 and the internal bottom portion of the case 100. When the first support portion 450 and the second support portion 460 move forward and are received in the space 120, the pedal housings 240 and 340 are pulled down by the elastic force of the pedal housing springs 600.

Here, an angle A1 formed between the planar portions 241 and 341 and the inclined portions 242 and 342 is greater than 90 degrees and less than 180 degrees.

The angle A1 formed between the planar portions 241 and 341 and the inclined portions 242 and 342 may be referred to as a bending angle, and the bending angle A1 satisfies the following condition: 90 degrees<A1<180 degrees.

If the bending angle is close to 90 degrees, it is easy to secure a space in which the first support portion 450 and the second support portion 460 are received when the accelerator pedal module 200 and the brake pedal module 300 enter the hidden state. However, a contact resistance between the bent portions 243 and 343 and the first and second support portions 450 and 460 moving backward for pop-up operation is increased, and thus a motor having a large capacity is required.

On the other hand, if the bending angle is close to 180 degrees, it is difficult to secure a space in which the first support portion 450 and the second support portion 460 are received when the accelerator pedal module 200 and the brake pedal module 300 enter the hidden state. However, because the contact resistance between the bent portions 243 and 343 and the first and second support portions 450 and 460 moving backward for pop-up operation is reduced, it is possible to use a motor having a small capacity.

In the pedal device according to an exemplary embodiment of the present disclosure, when the leadscrew 430 rotates due to operation of the first motor 410 and the first support portion 450 and the second support portion 460 move backward along the leadscrew 430 together with the nut 440 and come into contact with the planar portions 241 and 341 of the pedal housings 240 and 340, the accelerator pedal module 200 and the brake pedal module 300 pivot about the hinge pins 230 and 330 and enter the popped-up state in which the pedal pads 210 and 310 and the pedal arms 220 and 320 protrude from the footrest panel 10.

In the popped-up state of the accelerator pedal module 200 and the brake pedal module 300, the first support portion 450 and the second support portion 460 are in contact with both the planar portions 241 and 341 of the pedal housings 240 and 340 and the bottom surface of the case 100.

Furthermore, in the popped-up state of the accelerator pedal module 200 and the brake pedal module 300, the driver may manipulate the pedal pads 210 and 310. When the driver manipulates the pedal pads 210 and 310, manipulation force may be sufficiently supported by the connection structure between the pedal housings 240 and 340 and the case 100 via the first support portion 450 and the second support portion 460.

In the popped-up state shown in FIG. 4, the pop-up positions of the accelerator pedal module 200 and the brake pedal module 300 may be fixed by the first support portion 450 and the second support portion 460 fitted between the planar portions 241 and 341 of the pedal housings 240 and 340 and the case 100.

To the contrary, in the pedal device according to an exemplary embodiment of the present disclosure, when the leadscrew 430 rotates due to operation of the first motor 410 and the first support portion 450 and the second support portion 460 move forward along the leadscrew 430 together with the nut 440 and are received in the space 120 between the inclined portions 242 and 342 of the pedal housings 240 and 340 and the case 100, the accelerator pedal module 200 and the brake pedal module 300 are pulled by the pedal housing springs 600 to pivot about the hinge pins 230 and 330 and enter the hidden state in which the accelerator pedal module 200 and the brake pedal module 300 are inserted into and hidden in the case 100.

The case 100 is provided with a case stopper 130 protruding toward the pedal arms 220 and 320. As shown in FIG. 8, when the lower surfaces of the pedal housings 240 and 340 come into contact with the case stopper 130, the hide positions of the accelerator pedal module 200 and the brake pedal module 300 may be fixed.

Referring to FIG. 9, when the accelerator pedal module 200 and the brake pedal module 300 are in the hidden state, the planar portion 341 of the pedal housing 340 of the brake pedal module 300 may protrude farther downward than the planar portion 241 of the pedal housing 240 of the accelerator pedal module 200. Accordingly, the surface of the pedal pad 210 of the accelerator pedal module 200 and the surface of the pedal pad 310 of the brake pedal module 300 may be located on the same plane, leading to improvement of the design-related aesthetics of the pedal device.

Figure 5:
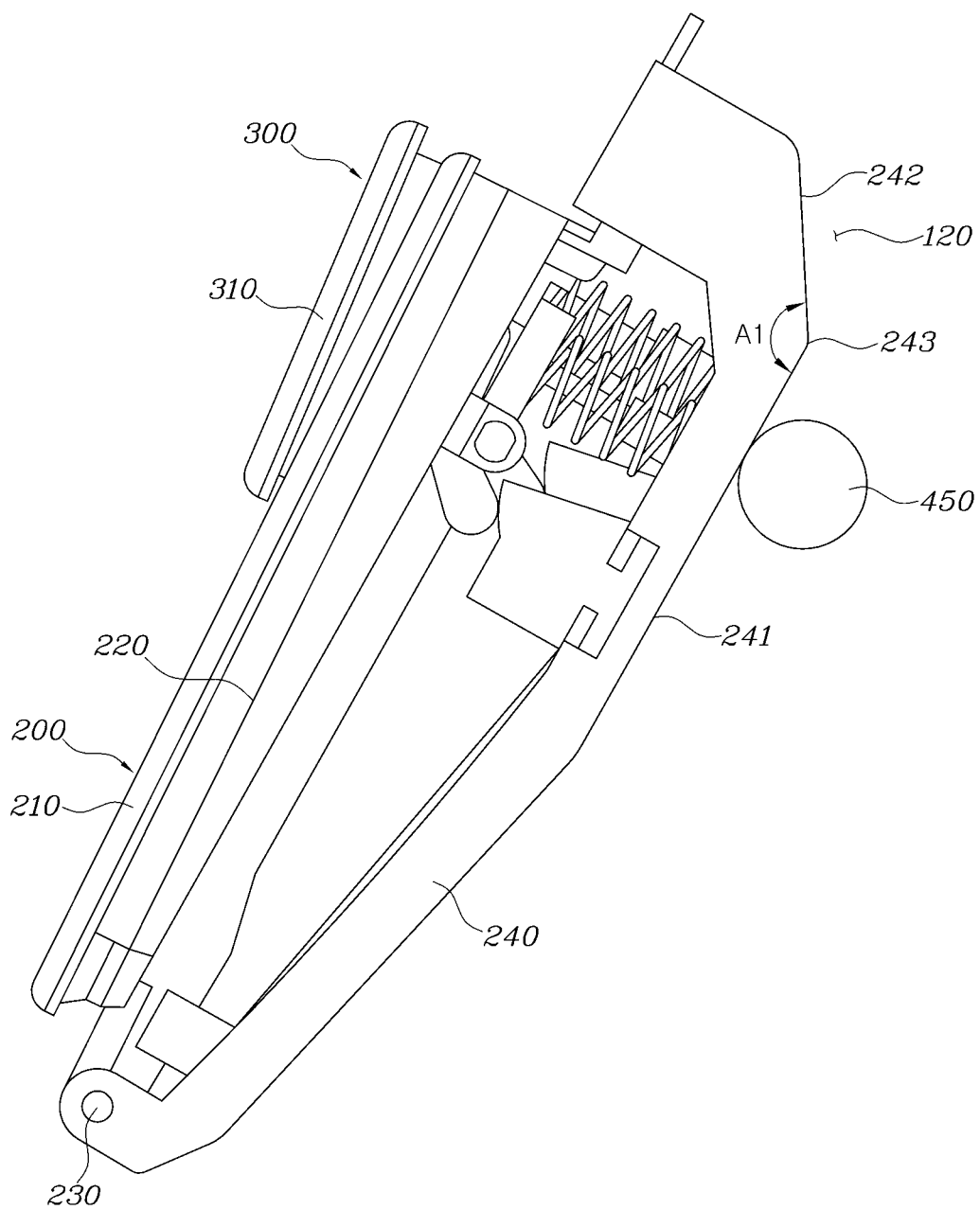
FIG. 5 is a view for explaining a state in which a surface of a pedal pad of a brake pedal module further protrudes than a surface of a pedal pad of an accelerator pedal module in the popped-up state.
Figure 6:
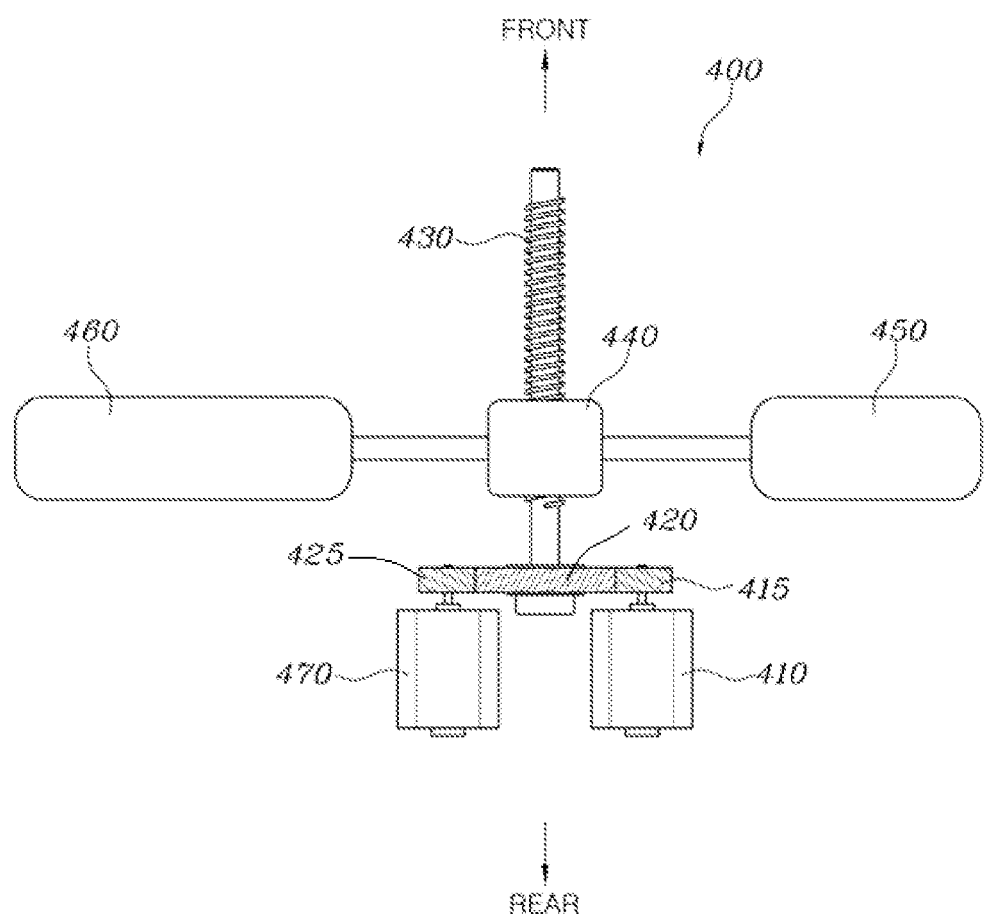
FIG. 6 is a view for explaining an actuator module according to an exemplary embodiment of the present disclosure.

Referring to FIG. 5, when the accelerator pedal module 200 and the brake pedal module 300 are in the popped-up state, the surface of the pedal pad 310 of the brake pedal module 300 further protrudes than the surface of the pedal pad 210 of the accelerator pedal module 200, leading to prevention of erroneous operation of the driver.

The first support portion 450 and the second support portion 460 according to an exemplary embodiment of the present disclosure are formed to have the same diameter.

Therefore, when the accelerator pedal module 200 and the brake pedal module 300 enter the popped-up state while being supported on the first support portion 450 and the second support portion 460, the surface of the pedal pad 310 of the brake pedal module 300 further protrudes than the surface of the pedal pad 210 of the accelerator pedal module 200 by a difference in position between the planar portion 241 of the accelerator pedal module 200 and the planar portion 341 of the brake pedal module 300 in the hidden state.

When the accelerator pedal module 200 and the brake pedal module 300 are popped up, the first support portion 450 and the second support portion 460 need to be in contact with both the planar portions 241 and 341 of the pedal housings 240 and 340 and the internal bottom surface of the case 100. Therefore, the first support portion 450 and the second support portion 460 are formed to have the same cross-sectional diameter.

If it is intended to pop up the pad surface of the brake pedal module 300 to a higher position than the pad surface of the accelerator pedal module 200 under the condition that the first support portion 450 and the second support portion 460 including the same diameter are used, the height of the planar portion 341 of the pedal housing 340 of the brake pedal module 300 is set to be lower than height of the planar portion 241 of the pedal housing 240 of the accelerator pedal module 200 in the hidden state.

Due to the structure in which the brake pedal module 300 is popped up to further protrude than the accelerator pedal module 200, it is possible to prevent erroneous operation by the driver.

As is apparent from the above description, according to the foldable pedal device of the present disclosure, an accelerator pedal module and a brake pedal module, which have different pop-up strokes, may be simultaneously popped up and hidden by operation of one actuator module, whereby weight reduction and cost reduction may be achieved, and the efficiency of use of space in the vehicle may be maximized through reduction in the size of the pedal device.

Furthermore, according to the foldable pedal device of the present disclosure, introduction of moisture and foreign substances may be blocked by shielding a gap between a footrest panel and a pedal module using a shield membrane, whereby the durability and marketability of the pedal device may be improved.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
    an accelerator pedal module and a brake pedal module mounted in a case to be spaced from each other in a leftward-rightward direction of the vehicle and configured to be moved in response to an operation of a driver; and
    an actuator module fixedly mounted in the case to be in contact with the accelerator pedal module and the brake pedal module and configured to simultaneously pop up the accelerator pedal module and the brake pedal module from the case or hide the accelerator pedal module and the brake pedal module in the case,
    wherein the case is located inside a footrest panel and includes an open upper portion coupled to and sealed by the footrest panel,
    wherein the accelerator pedal module and the brake pedal module are mounted through the footrest panel,
    wherein the footrest panel includes shield members mounted in holes formed in the footrest panel to allow the accelerator pedal module and the brake pedal module to pass through the holes, and
    wherein the shield members shield the holes to block introduction of foreign substances into the case.

2. The foldable pedal apparatus of claim 1, wherein each of the accelerator pedal module and the brake pedal module includes:
    a pedal pad;
    a pedal arm fixed to the pedal pad; and
    a pedal housing pivotally coupled to the pedal arm via a hinge pin.

3. The foldable pedal apparatus of claim 2, wherein the pedal pad and the pedal arm overlap each other in an upward-downward direction of the vehicle and are fixed to each other to be integrated, and
- wherein the pedal arm is coupled to the pedal housing so that an upper end portion of the pedal arm is pivotable forwards and backwards of the vehicle relative to the pedal housing about the hinge pin coupled to a lower end portion of the pedal arm.

4. The foldable pedal apparatus of claim 2,
- wherein the pedal housing is accommodated in the case,
- wherein the hinge pin is provided to penetrate the pedal housing and is coupled at each end portion of the accelerator pedal module and the brake pedal module to the case, and
- wherein the pedal housing is coupled to the case to be pivotable relative to the case about the hinge pin.

5. The foldable pedal apparatus of claim 4,
- wherein the shield members are shield membranes made of an elastic material.

6. The foldable pedal apparatus of claim 5, wherein the shield membranes are disposed between the pedal pad and the pedal arm of the accelerator pedal module and between the pedal pad and the pedal arm of the brake pedal module.

7. The foldable pedal apparatus of claim 4, wherein the actuator module includes:
- a first motor fixedly mounted in the case;
- a leadscrew connected to the first motor via a gear member and configured to be rotated by power from the first motor;
- a nut configured to allow the leadscrew to pass through the nut while being threadedly engaged with the nut and to move in a longitudinal direction of the leadscrew by rotation of the leadscrew; and
- a first support portion and a second support portion connected to the nut, disposed on left and right of the nut, and configured to move backward along the leadscrew together with the nut to contact with a lower surface of the pedal housing when the accelerator pedal module and the brake pedal module are popped up and to move forward along the leadscrew together with the nut to be separated away from the pedal housing when the accelerator pedal module and the brake pedal module are hidden.

8. The foldable pedal apparatus of claim 7, wherein the actuator module further includes a second motor fixedly mounted in the case and connected to the gear member.

9. The foldable pedal apparatus of claim 7, further including a pedal housing spring coupled at a first end portion thereof to the pedal housing of each of the accelerator pedal module and the brake pedal module and coupled at a second end portion thereof to the case to apply elastic force to the pedal housing so that the pedal housing pivots in a direction in which the pedal housing is inserted into the case.

10. The foldable pedal apparatus of claim 9, wherein the pedal housing includes a lower surface including:
- a planar portion formed in parallel to an internal bottom portion of the case to contact each of the first support portion and the second support portion moving forwards and backward directions; and
- an inclined portion extending at an incline forward and upward from a front end portion of the planar portion and defining a space to receive the first support portion and the second support portion between the pedal housing and the internal bottom portion of the case to prevent the first support portion and the second support portion from contacting with the pedal housing.

11. The foldable pedal apparatus of claim 10, wherein an angle formed between the planar portion and the inclined portion is greater than 90 degrees and less than 180 degrees.

12. The foldable pedal apparatus of claim 10, wherein, in response that the leadscrew rotates due to operation of the first motor and each of the first support portion and the second support portion moves backward along the leadscrew together with the nut and comes into contact with the planar portion of the pedal housing, each of the accelerator pedal module and the brake pedal module pivots about the hinge pin and enters a popped-up state in which the pedal pad and the pedal arm protrude from the footrest panel.

13. The foldable pedal apparatus of claim 10,
- wherein, in a situation that the accelerator pedal module and the brake pedal module are in a popped-up state, each of the first support portion and the second support portion is in contact with the planar portion of the pedal housing and the internal bottom portion of the case, and
- wherein manipulation force applied by the driver manipulating the pedal pad is supported by a connection structure between the pedal housing and the case via each of the first support portion and the second support portion.

14. The foldable pedal apparatus of claim 10, wherein a pop-up position of each of the accelerator pedal module and the brake pedal module is fixed by a corresponding one of the first support portion and the second support portion fitted between the planar portion of the pedal housing and the case.

15. The foldable pedal apparatus of claim 10, wherein, in a situation that the leadscrew rotates due to operation of the first motor and each of the first support portion and the second support portion moves forward along the leadscrew together with the nut and is received in the space between the inclined portion of the pedal housing and the case, each of the accelerator pedal module and the brake pedal module is pulled by the pedal housing spring to pivot about the hinge pin and enters a hidden state in which each of the accelerator pedal module and the brake pedal module is inserted into the case.

16. The foldable pedal apparatus of claim 10, further including a case stopper,
- wherein the case is provided with the case stopper protruding toward the pedal arm, and
- wherein a hide position of each of the accelerator pedal module and the brake pedal module is fixed when the lower surface of the pedal housing comes into contact with the case stopper.

17. The foldable pedal apparatus of claim 10, wherein, in a situation that the accelerator pedal module and the brake pedal module are in a hidden state, the planar portion of the pedal housing of the brake pedal module protrudes farther downward than the planar portion of the pedal housing of the accelerator pedal module, whereby a surface of the pedal pad of the accelerator pedal module and a surface of the pedal pad of the brake pedal module are located on a same imaginary plane.

18. The foldable pedal apparatus of claim 17, wherein, in a situation that the accelerator pedal module and the brake pedal module are in a popped-up state, the surface of the pedal pad of the brake pedal module further protrudes than the surface of the pedal pad of the accelerator pedal module to prevent erroneous operation of the driver.

19. The foldable pedal apparatus of claim 18,
- wherein the first support portion and the second support portion are formed to have a same diameter, and
- wherein, in a situation that the accelerator pedal module and the brake pedal module enter the popped-up state while being supported on the first support portion and the second support portion, the surface of the pedal pad of the brake pedal module further protrudes than the surface of the pedal pad of the accelerator pedal module by a difference in position between the planar portion of the accelerator pedal module and the planar portion of the brake pedal module in the hidden state.

20. A foldable pedal apparatus for a vehicle, the foldable pedal apparatus comprising:

an accelerator pedal module and a brake pedal module mounted in a case to be spaced from each other in a leftward-rightward direction of the vehicle and configured to be moved in response to an operation of a driver; and an actuator module fixedly mounted in the case to be in contact with the accelerator pedal module and the brake pedal module and configured to simultaneously pop up the accelerator pedal module and the brake pedal module from the case or hide the accelerator pedal module and the brake pedal module in the case, wherein each of the accelerator pedal module and the brake pedal module includes:

a pedal pad;

a pedal arm fixed to the pedal pad; and a pedal housing pivotally coupled to the pedal arm via a hinge pin, and wherein the actuator module includes:

a first motor fixedly mounted in the case;

a leadscrew connected to the first motor via a gear member and configured to be rotated by power from the first motor;

a nut configured to allow the leadscrew to pass through the nut while being threadedly engaged with the nut and to move in a longitudinal direction of the leadscrew by rotation of the leadscrew; and a first support portion and a second support portion connected to the nut, disposed on left and right of the nut, and configured to move backward along the leadscrew together with the nut to contact with a lower surface of the pedal housing when the accelerator pedal module and the brake pedal module are popped up and to move forward along the leadscrew together with the nut to be separated away from the pedal housing when the accelerator pedal module and the brake pedal module are hidden.

* * * * *